United States Patent Office 3,060,791
Patented Oct. 30, 1962

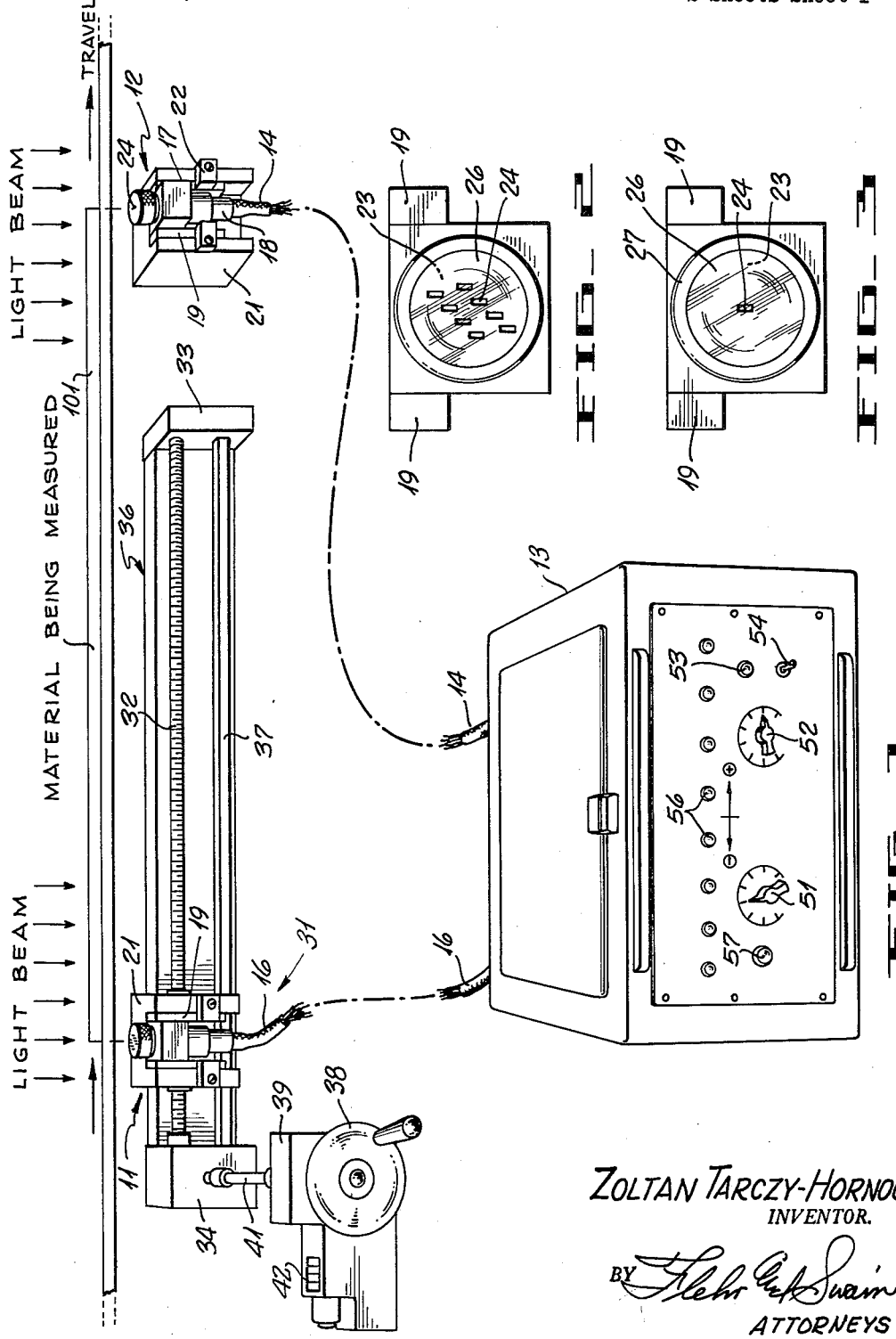

3,060,791
GEOMETRICAL GAUGING APPARATUS
Zoltan Tarczy-Hornoch, Berkeley, Calif., assignor to W. K. Rosenberry doing business as Able Research Lab., Berkeley, Calif.
Filed June 2, 1959, Ser. No. 817,652
5 Claims. (Cl. 88—14)

This invention relates to a geometrical gauging apparatus and more particularly to a geometrical gauging apparatus suitable for controlling the length, width, or shape of any material fabricated into spaced discrete members or elements.

Heretofore, when material has been cut into predetermined lengths, the accuracy of the cutting operation has often been determined by merely taking random samples, measuring the samples taken, and then adjusting the cutting apparatus in accordance with the measurements made. It is clear that such a method is time-consuming and inaccurate. Measuring devices have been utilized which depend upon the speed of the conveyor and hence are subject to the inherent limitation of the accuracy of speed control of the conveyor. Counting wheels have also been utilized, but the accuracy of these devices is limited by the amount of slippage between the counting wheels and the belt. There is, therefore, a great need for apparatus for measuring the length and width or shape of any material fabricated in discrete elements while being carried by a moving conveyor.

In general, it is an object of the present invention to provide geometrical gauging apparatus which measures discrete members or elements while being carried by a conveyor and generates a signal for accepting or rejecting the members based upon their conformity to predetermined tolerance limits.

Another object of the invention is to provide apparatus of the above character which can be utilized for measuring length, width, or shape of the elements or members.

Another object of the invention is to provide apparatus of the above character in which the elements or members can be measured while moving at a high rate of speed.

Another object of the invention is to provide apparatus of the above character in which a visual indication of the measurement is given so that the operator knows what is occurring.

Another object of the invention is to provide apparatus of the above character in which symmetrical or asymmetrical tolerance limits can be selected.

Another object of the invention is to provide apparatus of the above character in which out-of-tolerance elements give an output signal which can be utilized for actuating a control system to cause rejection of the out-of-tolerance element.

Another object of the invention is to provide apparatus of the above character in which the accuracy of measurement is independent of the speed of movement of the element or the rate at which the measurements are made.

Another object of the invention is to provide apparatus of the above character in which measurements can be made at very high speeds.

Another object of the invention is to provide apparatus of the above character which has very high accuracy.

Another object of the invention is to provide apparatus of the above character in which light is utilized.

Another object of the invention is to provide apparatus of the above character in which the light intensity requirements are not critical.

Another object of the invention is to provide apparatus of the above character which can be programmed in advance to measure elements or members of different shapes.

Another object of the invention is to provide apparatus of the above character in which the measurement of the element is electronically recorded.

Additional objects and features of the invention will appear from the following description in which the preferred embodiment has been set forth in detail in conjunction with the accompanying drawings.

Referring to the drawings:

FIGURE 1 is a perspective view of apparatus incorporating the present invention.

FIGURE 2 is a plan view of the reading head.

FIGURE 3 is a plan view of the interrogator head.

Figure 4:
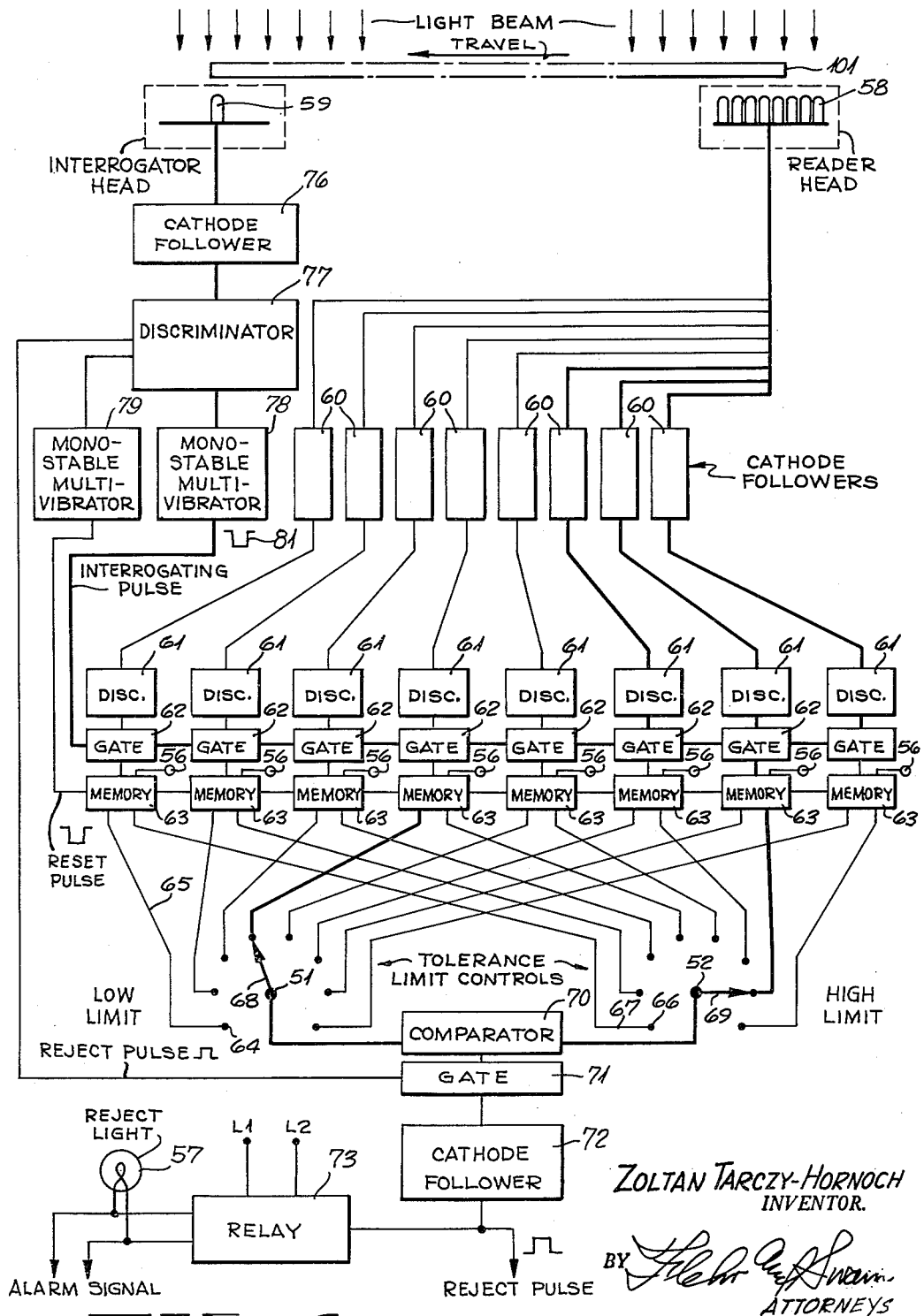
FIGURE 4 is a block diagram with certain elements schematically illustrated of the electrical circuitry of the apparatus.

In general, the present invention consists of apparatus for measuring moving members. A source of light is positioned on one side of the moving member and a reading head having a plurality of light sensitive elements is positioned so that it can view the moving members. A discriminator connected to each of the light-sensitive elements assumes one stable state when the light-sensitive element connected thereto is exposed to the light source and another stable state when the light-sensitive element is not exposed to the light source. A gate connected to each of the discriminators is turned on when the device assumes one state and off when the device assumes the other state. A memory is connected to each of the gates. An interrogator head having a light-sensitive element is spaced from the reader head a distance approximately equal to the length of the measurement to be made and is also positioned so that it can view the moving members. Means is connected to the interrogator head for generating interrogating pulses so that when the member cuts off the light to the interrogator head, an interrogating pulse is applied to the gates to record in the memories which of the discriminators has assumed a certain stable state. First selecting means and second selecting means are connected to the memories. One of the selecting means is utilized for selecting the low limit tolerance whereas the other selecting means is utilized for selecting the high limit tolerance. Means is provided for comparing the outputs from the selecting means. A gate is operated by the comparison means and controls the application of a reject pulse to a control mechanism so that when a member or element is not within the preselected tolerance limits, it is rejected.

As shown in FIGURE 1 of the drawing, the geometrical gauging apparatus consists of reading means in the form of a reader head 11 and interrogating means in the form of an interrogator head 12 connected to a cabinet 13 containing electrical circuitry (hereinafter described) by cables 14 and 16.

Each of the heads includes one or more photo-sensitive diodes (hereinafter described) mounted within a body 17 and connected to the associated cable by connectors 18. The body 17 is provided with legs 19 to facilitate mounting of the head in suitable means such as a supporting block 21 provided with releasable clamping bars 22.

A plate 23 provided with one or more apertures 24 overlies the photo-sensitive diode or diodes within the body. Each aperture directly overlies a diode and serves to direct the light passing to the diode. A glass window 26 overlies the plate 23 and prevents dirt and the like from passing into the apertures. A knurled cap 27 is threaded onto the body 17 and serves to hold the window 26 and the plate 23 in place.

As will be noted, particularly from FIGURE 2, the reader head 12 has been provided with eight apertures 24 which have been aligned in two rows in a staggered relationship so that one aperture in one row is opposite from the space between two apertures in the other row. This arrangement permits closer spacing of the apertures and thereby makes possible the measurement of smaller increments. For example, in one embodiment the apertures were spaced apart 1/32 of an inch. With the staggered relationship measurements of 1/64 of an inch were made.

The reader head 11 is carried by a traverse mechanism 31. It consists of a lead screw 32 threaded into the mounting or supporting member 21 which carries the reader head. The lead screw 32 is rotatably supported by end members 33 and 34 mounted on the framework 36. The mounting member 21 for the reader head is guided in its travel by a square rod 37 also supported by the end members 33 and 34. The lead screw 32 is adapted to be driven by a hand wheel 38 rotatably mounted on a housing 39 and connected to the lead screw by a shaft 41. The end member 34 houses gearing (not shown) for transferring the motion of the shaft 41 to the lead screw 32. The housing 39 includes a counter 42 for counting the number of rotations of the hand wheel to facilitate accurate placement of the reading head.

The reader head and the entire traverse mechanism can be supported below the conveyor for the moving member by suitable means. The interrogator head 12 is fixed to the conveyor at a point spaced from the reader head and on the same side of the path of movement of the members or elements as the reader head. It is normally spaced from the reader head a distance roughly equal to the dimension to be measured so that final adjustments can be made with the traverse mechanism which carries the reader head. The interrogator head is provided with a single aperture 24 and a single diode as hereinafter described.

The electrical circuitry in the cabinet 13 includes a low limit tolerance control in the form of a selector switch 51 and a high limit tolerance control in the form of a selector switch 52. It also includes an on-light 53 and a power switch 54, indicating lamps 56, and a reject lamp 57.

As shown schematically in FIGURE 4, the reader head includes eight photodiodes 58 and the interrogator head includes one photodiode 59. The photodiodes can be of any suitable type, such as Sylvania type 1N77B, which is designed for operation in the visible and the infra-red spectrum. Each of the photodiodes in the reader head is connected to a cathode follower 60. Each of the cathode followers 60 is connected to a discriminator 61. The cathode follower serves as an impedance matching device. Each of the discriminators is connected to a gate 62, and each of the gates 62 is connected to a memory 63. The discriminator, gate, and memory circuits are of a type well known to those skilled in the art, and, hence, will not be described in detail. For example, the discriminator 61 can be, which is conventionally termed, a Schmitt trigger circuit, the gate 62 can be formed of diodes, and the memory 63 can be a suitable circuit such as a bistable multivibrator commonly called a binary.

Each of the binaries 63 has a normally low voltage side and a normally high voltage side, well known to those skilled in the art. The low voltage side is indicated as being on the left and is connected to one of the terminals 64 of the switch 51 by a conductor 65. The high voltage side of each of the binaries is connected to one of the terminals 66 of the high limit switch 52 by conductor 67. Each of the binaries drives one of the indicating lamps 57 mounted on the cabinet 13 to give a visual indication of the measuring operation as hereinafter described.

Switches 51 and 52 are provided with wipers 68 and 69, adapted to engage the terminals 64 and 66. The wipers 68 and 69 are connected to a comparator 70, and the comparator 70 is connected to a gate 71. The comparator 70 and the gate 71 are of a type similar to those described above. The gate 71 is connected to a cathode follower 72. The output of the cathode follower is applied to a relay 73, which when energized causes the application of power from lines L1 and L2 to cause the lighting of the reject light 57 and the generation of the alarm signal and other control signals as desired.

The photodiode 59 in the interrogator head is connected to a cathode follower 76, and the cathode follower 76 is connected to a discriminator 77. The discriminator 77 is connected to a pair of monostable multivibrators 78 and 79.

The multivibrators 78 produces the interrogating pulse and is connected to the gates 62. The multivibrator 79 produces a reset pulse and is connected to the memories 63. The discriminator 77 is connected to the gate 71 and produces a reject pulse which is applied to this gate.

Operation of the apparatus may now be briefly described as follows: Let it be assumed that the geometrical measuring apparatus has been mounted on a suitable conveyor for measuring the lengths of the sheets of material and that the apparatus is to be utilized for rejecting sheets of material that are not within certain tolerances. In doing so, the traverse mechanism 31 carrying the reader head is mounted on the conveyor. The interrogator head 12 is mounted on the conveyor in a position so that the distance between the interrogator head and the reader head is roughly equal to the length of sheets of material to be measured. The reader head 11 is then exactly positioned by the use of the lead screw 32 which is driven by the hand wheel 38. Generally, the reader head 11 is positioned so that when the forward or leading edge of the sheet of material is overlying the aperture in the interrogator head the trailing edge of a sheet of the proper length is centrally positioned over the apertures in the reader head.

The low limit and high limit tolerance switches 51 and 52 are then set to the desired tolerances. For example, as shown in the drawing, the apparatus has been set so that the apparatus will reject all sheets of material having a length which is not within a predetermined range less than the desired length as determined by the selected fourth terminal of the switch 51 and all sheets having a length which is not within a predetermined range greater than the desired length as indicated by the selected seventh terminal of the switch 52.

Now let it be assumed that a sheet of material 101 is being advanced by the conveyor and that the leading edge of the sheet has passed over the reader head 11 and is moving to the right as viewed in FIGURE 1 and to the left as viewed in FIGURE 4 and has just come to the point where it interrupts the light beam passing into the aperture 24 of the interrogator head 12. Interruption of the light beam passing to the photodiode 59 causes a change in the voltage supplied to the cathode follower 76 by the photodiode. The signal from the cathode follower 76 is supplied to the discriminator 77 which generates a pulse and applies it to the monostable multivibrator 78 to cause it to produce a fairly uniformly shaped interrogating pulse 81. This interrogating pulse is applied to the gates 62 for a purpose hereinafter described.

At the instant the interrogating pulse 81 is being applied to the gates 62, a number of the photodiodes 58 in the reader head are covered by the sheet of material 101 to prevent the passage of light thereto. For example, as shown in FIGURE 4, three of the photodiodes are uncovered and five of the photodiodes are covered. The photodiodes in a conventional circuit supply voltages of two different levels to the cathode followers. When a diode is uncovered and exposed to the light, it supplies a relatively high voltage to the cathode follower. Whereas, when it is covered by a sheet of material, it supplies a relatively low voltage. The discriminators 61 respond instantly to the two different voltage levels from the photodiodes 58, that is, the discriminators assume one stable state when the voltage from the diode is of low value and the other stable state when the voltage is of high value.

When a high voltage level is supplied to one of the discriminators by a uncovered photodiode, the discriminator triggers the associated gate 62 to an "on" position and maintains the gate in this "on" position until the photodiode is covered. Thus, with the first five photodiodes (counting from the left of FIGURE 4) covered, the gates 62 for those first five diodes will be in an "off" position, whereas the gates for the last three diodes will be in an "on" position.

At the same instant that the gates 62 are in these positions, the interrogating pulse 81 is applied to the gates 62. Since the first five gates are closed or "off," the interrogating pulse cannot trigger the first five memories. However, since the last three gates are held in an "on" position by the discriminators, the last three memories can be triggered by the interrogating pulse to cause each of the last three memories which are normally in a first stable state to assume a second stable state.

It will be appreciated that the interrogating of the gates 62 takes place instantaneously at the time the leading edge cuts off the light beam to the interrogating head, and for that reason the memories 63 serve to record or memorize the exact position of the trailing edge of the sheet of material 101 with respect to the reader head. The fact that the sheet of material 101 may be moving at a relatively rapid speed is of no significance because the position of the trailing edge of the sheet is recorded instantaneously. The fact that additional photodiodes are uncovered as the sheet continues to move does not affect the information recorded because the memories have already recorded the desired information.

It will be noted that the normally low voltage side of the fourth memory or binary is connected to the comparator 70 through the wiper 68 of the switch 51 and that the normally high voltage side of the seventh memory or binary is connected to the comparator 70 by the wiper 69 of the switch 52. Since the fourth memory is an "off" memory and the seventh memory is an "on" memory, a voltage difference is not supplied to the comparator 70. This is true because the output voltages of the memories are such that the left side voltage of an "off" memory is equal to the right side voltage from an "on" memory. Since a voltage difference is not applied to the comparator 70, the gate 71 is not turned on, and a reject pulse cannot pass through the gate to energize the relay 73. The discriminator 77 generates a reject pulse as long as the photodiode 59 is covered by the sheet. The gate 71 remains off as long as the sheets are within tolerance.

When the trailing edge of the sheet 101 moves past the photodiode in the interrogator head, the photodiode 59 is again exposed to the light and generates a higher voltage which is applied to the discriminator 77 through the cathode follower 76. As soon as this occurs the discriminator assumes its first or normal stable state and triggers the monostable multivibrator 79 to cause it to produce a reset pulse which is used for resetting the memories to their first or normal state. At the same time that the discriminator assumes its first state, the generation of the reject pulse is terminated.

Now let it be assumed that a sheet of material is so long that at the time the leading edge covers the photodiode 59 in the interrogator head, all the photodiodes in the reader head are covered. In such a situation, the discriminators 61 are all in an "off" position, and the gates 62 are "off" to prevent triggering any of the memories 63 by the interrogating pulse 81. Since all the memories are off, a voltage difference is supplied to the comparator 70 because the comparator is connected to the left side and the right side of two memories that are in the same condition. As soon as this voltage difference is supplied to the comparator 70, the gate 71 is triggered to an "on" position and passes the reject pulse from the comparator to the cathode follower to cause operation of the relay 73.

The relay 73 can be utilized for operating the reject light 57, as shown, and additional control devices, such as a solenoid operated device for removing the rejected sheet from the conveyor. For example, the solenoid operated device can be utilized for operating a gate controlling passage of the sheets of material from one path to another. A suitable time delay easily can be obtained by recording the reject pulse on a suitable memory device, such as a closed loop of magnetic tape.

The remainder of the operation is similar to that hereinafter described. A reset pulse is generated by the multivibrator 79 after which the apparatus is ready to measure another sheet of material.

Now let it be assumed that a sheet of material is so short that by the time the interrogator head is covered by the leading edge of the sheet of material, none of the photodiodes in the reader head are covered. When this occurs, all of the discriminators and the gates 62 will be in an "on" position. The interrogating pulse can, therefore, trigger all the memories 63 to an "on" position and cause lighting of all the lamps 56. This also causes a voltage difference to be applied to the comparator 70 which causes triggering of the gate 71. A reject pulse is passed by the gate to the cathode follower 72. Thus, it can be seen that with the low and high limit tolerance controls set as indicated in the drawing, all sheets which cover more than six photodiodes and uncover more than four photodiodes at the moment the leading edge covers the interrogator photodiode 59 will be rejected by the apparatus.

A visual indication of what is occurring in the measuring operations being performed by the gauging apparatus is given by the row of lamps 56 on the cabinet. The lamps are connected to the memories and are energized when the memories are in an "on" position and are de-energized when the memories are reset to their "off" position. The lamps, therefore, give a visual indication as to what is occurring—whether the sheets of material being measured are becoming longer or whether they are becoming shorter. The reject lamp 57 serves to indicate how many of the sheets of material are being rejected and thus indicates whether the shears which are performing the cutting operation should be adjusted.

One embodiment of the present invention was utilized for measuring sheets of tinplate travelling along a conveyor. A rolled strip of tinplate was advanced through a shear where it was cut into sheets at a relatively high speed and carried away on a conveyor. The conveyor had a speed of approximately ten percent greater than the strip speed so that there was a spacing between the sheets. The sheets were to be used for making up tin cans and travelled along the conveyor at a speed of approximately 1,200 feet per minute.

The staggered reader photodiodes were spaced on $\frac{1}{32}$ inch centers, and for that reason each of the pilot lamps 56 on the control panel of the cabinet 13 represented a $\frac{1}{32}$ of an inch increment of length as explained above. With such increments of length, tolerance limits from plus or minus $\frac{1}{64}$ of an inch when the two switches 51 and 52 are set on adjacent photodiodes to plus or minus $\frac{7}{64}$ of an inch can be selected by the switches 51 and 52. Symmetrical or asymmetrical limits also can be selected by the control switches 51 and 52. With such components, it was found that the apparatus could measure within plus or minus 0.002 of an inch of the set tolerance limit at the rate of 150,000 sheets per minute with a sheet velocity from zero to 50,000 feet per minute.

It was found that the light source requirements were non-critical. A suitable source was found to be a 300 watt reflector spotlight located three to five feet from each detector assembly. Any normal ambient light could be tolerated without affecting the operation of the instrument.

Because of the cathode followers utilized in the circuitry, it was found that the control cabinet 12 could be located up to 100 feet from the interrogator and reader heads without loss of measurement accuracy.

The primary advantage of the measuring apparatus is that the accuracy of measurement by the apparatus is completely independent of the speed at which the material is travelling or at the rate which the measurements are made. This is true because the apparatus records or memorizes the length of the sheet at the instant the leading edge of the sheet interrupts the light to the interrogating head.

It will be appreciated that the apparatus, as hereinbefore described, measures actual length of the sheet of material. In other words, the actual occupied length of the sheet is measured. Therefore, if the sheet is not flat or is curled, the real length of the sheet is not measured.

To accurately measure a certain dimension of a member or element, that dimension must be parallel to the line between the reader head and the interrogator head. Accurate measurement can be accomplished by guiding the sheets of material mechanically so that they are properly oriented at the time they arrive at the measuring station. If desired, the position of the sheet of material at a particular place on the conveyor can be checked by photodiodes connected to a control device which properly aligns misaligned sheets.

The gauging apparatus may also be utilized for measuring sheets of material which have an irregular geometric configuration. An irregular sheet is measured by utilizing a plurality of the reader heads 11 and a single interrogator head 12. The reader heads are positioned in a manner so that they outline all of the edges of the sheet with the exception of one edge on which the interrogator head is placed. At the time the leading edge of the sheet of material covers the interrogator head, the sheet of material must cover the other reader heads 11 in a manner which is within the tolerances allowed for the sheet of material. As many dimensions of the sheet of material can be measured as desired. All that is required is additional reader heads. Any sheet which is not within the required tolerance will be rejected.

It is not absolutely necessary that the sheets of material be uniformly positioned on the conveyor. However, this is generally desirable since it greatly simplifies the gauging apparatus. Normally, if the sheet is not in the proper position, it is desirable to position the same mechanically. However, if desired, a pattern of reader heads can be placed under the conveyor and connected into computer-type circuitry which has been properly programmed to select all sheets of material which are within required tolerances.

It is apparent from the foregoing that my gauging apparatus is particularly adapted for measuring the length, width, or shape of discrete members or elements at a high repetition rate and at a high velocity. The accuracy of measurement is essentially independent of the speed of movement or of the rate at which measurement is made. Measurements can be made of sheets or elements of any length of material.

Although the apparatus has been shown with the source of light on one side of the path of the moving members and the reading and interrogating heads on the other side of the path of the moving members, it is apparent that the reading and interrogating heads may be placed on the same side as the source of light merely by projecting the image of the moving members onto a screen through which light can pass and which is viewed by the reading and interrogating heads.

I claim:
1. In a geometric gauging apparatus for measuring moving members, a source of light on one side of the path of the moving members, a reading head having a plurality of light sensitive elements positioned on the other side of the path of movement of the moving members opposite the light source, a discriminator connected to each of the photosensitive elements, an "on-off" gate connected to each of the discriminators, a memory connected to each of the gates, an interrogating head having a light sensitive element spaced from the reading head and on the same side of the path of movement of the members as the reading head, means connected to said element in said interrogating head and to said gates for generating an interrogating pulse when one of said members cuts off the light source to said light sensitive element in said interrogating head, and means connected to said memories for generating a signal when more than a predetermined number of said photosensitive elements in said reader head are exposed to the light source and less than a predetermined number of said photosensitive elements in said reader head are cut off from the light source.

2. In a geometric gauging apparatus for measuring moving members, a source of light on one side of the path of the moving members, a reading head having a plurality of light sensitive elements positioned on the other side of the path of movement of the moving members and opposite the light source, a discriminator connected to each of the photosensitive elements, a gate connected to each of the discriminators, a memory connected to each of the gates, the memories having normally high and low voltage sides, a comparator, means adapted to connect the high and low voltage sides of the memories to the comparator, a gate connected to the comparator, an interrogating head having light sensitive element spaced from the reading head and positioned on the same side of the path of movement of the members as the reading head opposite the source of light, a discriminator connected to said light sensitive element on the interrogating head and to said first-named gates for sequentially applying an interrogating pulse to said first-named gates, said last-named discriminator generating an interrogating pulse at the time when the light to the interrogating head is interrupted by one of said members, means connecting said last-named discriminator to said gate connected to said comparator, said last-named discriminator serving to generate a reject pulse and applying the same to said gate connected to said comparator when the light to said interrogating head is interrupted by one of said members, and means connected to said last-named discriminator and said memories for generating a reset pulse for resetting said memories, said last-named discriminator generating a reset pulse at the time the light beam to the interrogating head is no longer interrupted by a member.

3. Apparatus as in claim 2 wherein said interrogating head is mounted in a fixed position and wherein said reading head is mounted for movement relative to the interrogating head.

4. Gauging apparatus as in claim 2 wherein said means for connecting memories to said additional discriminator consists of a pair of switches.

5. In a geometric gauging apparatus for measuring moving members, a source of light, a reading head having a plurality of light sensitive elements, means for determining which of said light sensitive elements in said reading head are exposed to the light source, an interrogating head having a light sensitive element spaced from the reading head, said reading and interrogating heads being positioned to view the moving members, means operated when the light of said interrogating head is interrupted to record which of the light sensitive elements in said reading head are exposed to the light source, means for generating a signal from the recorded information when more than a predetermined number of said light sensitive elements in said reading head are cut off from the light source by a member and less than a predetermined number of said light sensitive elements in said reading head are exposed to the light source at a time a member interrupts the light beam to the inerrogating head, said means for determining which of the elements of the reading head are exposed to the light source consisting of a discriminator connected to each element, and a gate connected to each discriminator, said gates being operated by said discriminators, said means for recording which of the light sensitive elements are exposed to the light source consisting of a memory connected to each of the gates and means operated by the interrogating head for applying a pulse to the gates to operate the memories.

References Cited in the file of this patent

UNITED STATES PATENTS

| | | |
|---|---|---|
| 1,998,950 | Cockrell | Apr. 23, 1935 |
| 2,916,633 | Stone et al. | Dec. 8, 1959 |
| 2,933,185 | Coleman et al. | Apr. 19, 1960 |